No. 822,151. PATENTED MAY 29, 1906.
J. F. PEASE & E. SCHUMACHER.
WHEEL.
APPLICATION FILED JULY 31, 1905.
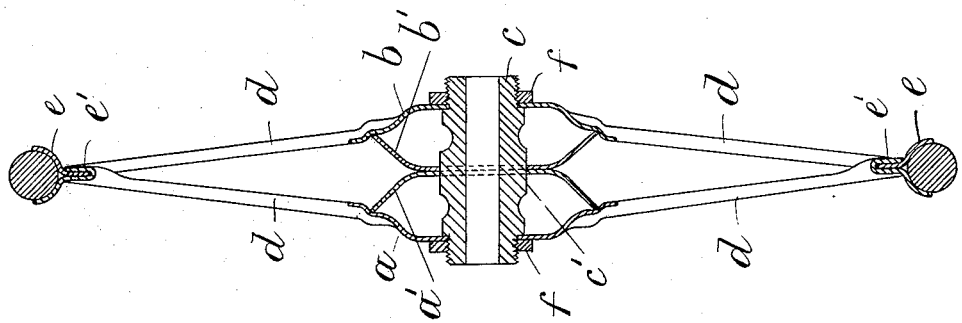
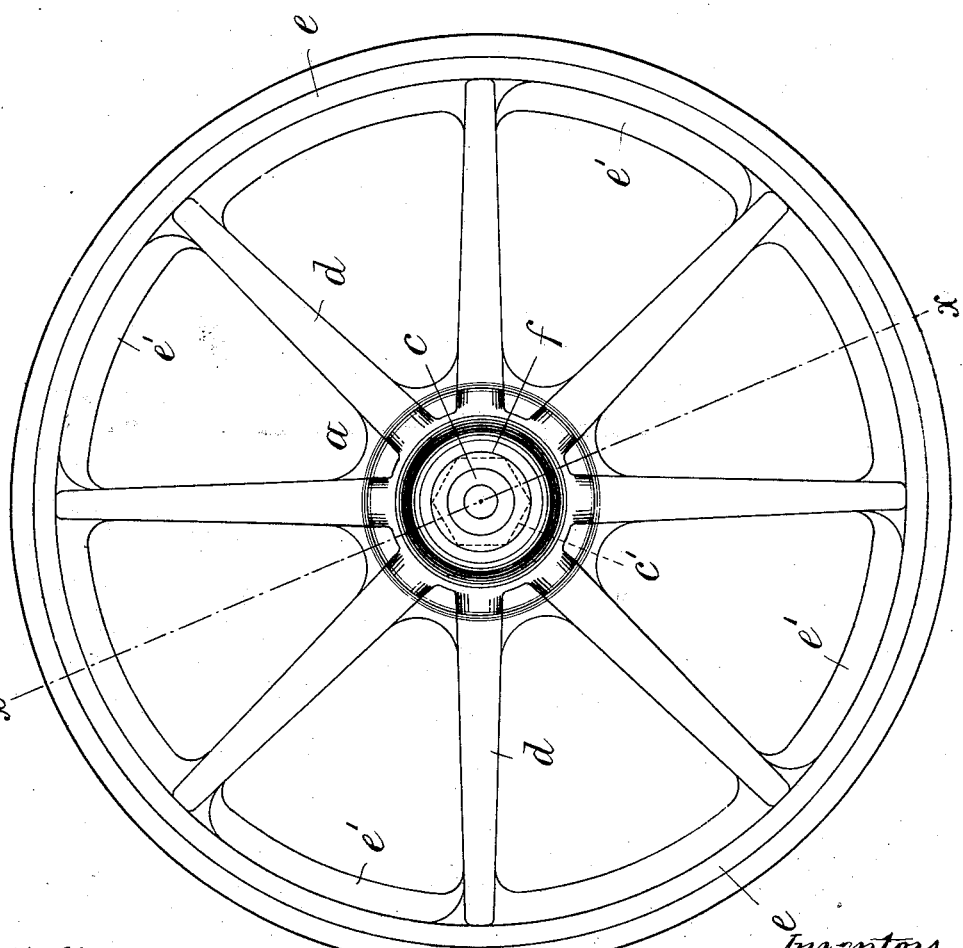
Witnesses.
W. Max. Duvall.
Harry V. Ruebsam.
Inventors.
J. F. Pease and
E. Schumacher
by Wilkinson & Fisher
his Attorneys

UNITED STATES PATENT OFFICE.

JOHN FRANCIS PEASE AND EBERHARD SCHUMACHER, OF DARLINGTON, ENGLAND.

WHEEL.

No. 822,151.  Specification of Letters Patent.  Patented May 29, 1906.

Application filed July 31, 1905. Serial No. 271,979.

*To all whom it may concern:*

Be it known that we, JOHN FRANCIS PEASE and EBERHARD SCHUMACHER, subjects of the King of Great Britain and Ireland, residing at Darlington, in the county of Durham, England, have invented certain new and useful Improvements in Wheels for Motor-Cars, Cycles, or other Vehicles for Road or Rail; and we do hereby declare the following to be a full, clear, and exact description of the invention, such as will enable others skilled in the art to which it appertains to make and use the same.

This invention relates to wheels as adapted to motor-cars, cycles, and other vehicles, either for road or rail, the object in view being to produce such wheels of great strength and light weight at a low cost of manufacture.

The wheel is constructed in two main or principal sections, the plane of division between which being the central plane of the wheel's rotation. These main sections are preferably equal and similar, each having its own hub abutting against the hub of the other and both mounted on the same bush, the two sections formed by stamping being clenched together at their peripheries to form a complete wheel.

Having thus indicated the nature and utility of our invention in order that it may be clearly understood and readily carried into effect, we will proceed to further describe the same and for that purpose shall refer to the accompanying drawings, in which a convenient form of construction for the purposes of our invention is shown in Figures 1 and 2, Fig. 1 being a front elevation of the wheel and Fig. 2 a transverse sectional view taken on line $x\ x$ of Fig. 1.

In the drawings, and more especially in Fig. 2, it will be observed that the two sections making up the wheel are preferably equal and similar, each having its own hub abutting against the hub of the other and both mounted on the same bush $c$. Each hub is made up of two apertured center plates $a\ a'$ and $b\ b'$, dished or hollowed out for strength and to provide a more extended bearing-surface on the bush $c$. In some cases the inner hub-plate $a'$ or $b'$ terminates at the line or ring of contact with the outer hub-plate $a$ or $b$, internally trussing the hollow hub transversely thereof and particularly at the point of joinder with the spokes, thereby preventing buckling at this point. Each of the outer hub-plates $a\ b$ extends in the form of spokes $d$ to its own periphery, which forms one side of the rim or tire $e$ of the wheel, the finished or combined shape of hub, rim, and spokes taking a form convenient for stamping out of a disk. When the two hubs are mounted in position on the bush $c$, their peripheries are in contact and being of suitable form for the purpose are made to constitute the tire-rim $e$ by clenching or other equivalent method of securing them together, the overlaps $e'$ alternating with each other on either side of the wheel. The spokes $d$, which spring from the hubs in two corresponding sets, converge toward each other in pairs, thus affording great mutual support combined with great lightness, the spokes being hollowed out or molded to any suitable section conducing to this, or where still greater strength is required instead of the inner hub-plate $a'$ or $b'$ terminating at the line or ring of contact with the outer hub-plate $a$ or $b$ both plates may extend in the form of spokes terminating in a united periphery, the spokes and periphery being adapted for manufacture by stamping and clenching together, the two combination peripheries thus formed being clenched together to constitute one tire or rim, as before.

The bush $c$ is preferably hexagonal in form to fit hexagonal openings in the hubs or bosses of the wheel, the internal hub-plates $a'$ and $b'$ having larger openings and the bush being correspondingly enlarged at the center $c'$ to fit them. Nuts $f$ on the end of the bush afford convenient means for securing the hubs tight together. If a further interlock between the plates of each hub is desirable to prevent any tendency for independent rotation of either without the other, this can be conveniently effected by providing projections on the one to fit into corresponding recesses of the other.

Having thus described the nature, object, and essential features of our invention and the manner of carrying the same into effect, we wish it to be understood that the method or principle of building up a wheel on twin hubs mounted on the same axle is not new, twin hubs set apart by some suitable device having been described in the specifications of various Letters Patent from time to time and prior to the date of our present application for Letters Patent. We therefore make no claim to the use of twin hubs otherwise than when abutting together in the manner embodied in and carried into practice by our improvements as above specified.

Having thus described our invention, what we desire to claim and secure by Letters Patent of the United States is—

1. A metallic wheel formed from two circular sections centrally spaced apart and joined at their peripheries, and means internally trussing the central spaced portion thereof comprising trussing members centrally abutting and diverging into engagement with said circular section, substantially as described.

2. A metallic wheel formed from two circular sections centrally spaced apart and joined at their peripheries, and means internally trussing the central spaced portion thereof, comprising trussing-plates centrally abutting and diverging outwardly and engaging said circular sections, substantially as described.

3. A metallic wheel formed from two circular sections having complementary center plates and peripheral plates, said center plates being spaced apart and the peripheral plates joined together to form the felly, in combination with trussing-plates, within said spaced portion, abutting centrally and projecting outwardly into engagement with said sections, forming with said center plates an internal truss for the hub of the wheel, substantially as described.

4. A metallic wheel formed from two circular sections having complementary center plates and peripheral plates, said center plates being disk-shaped and spaced apart and the peripheral plates joined together to form the felly, in combination with trussing-plates, within said spaced portion, abutting centrally and projecting outwardly into engagement with said sections, forming with said center plates an internal truss for the hub of the wheel, substantially as described.

5. A metallic wheel made from two disks each stamped out to form an apertured central plate, with spokes radiating therefrom and terminating in an annular rim, said central plates being spaced apart and said annular rims being joined and formed into the wheel-felly, in combination with apertured abutting plates located between said spaced central plates and diverging outwardly at their outer edges into engagement with said central plates substantially at the place of joinder between said plates and spokes, and an axis member passing transversely through said apertured plates, with means for forcing same toward each other and holding same locked on said axis member, substantially as described.

In testimony whereof we affix our signatures in presence of two witnesses.

JOHN FRANCIS PEASE.
EBERHARD SCHUMACHER.

Witnesses:
JOHN J. GEARE,
W. H. NIXON.